United States Patent [19]
Arda et al.

[11] Patent Number: 6,026,405
[45] Date of Patent: Feb. 15, 2000

[54] METHOD OF LOCATING AND DOWNLOADING FILES ON A NETWORK

[75] Inventors: Sreedhar Reddy Arda, Austin; William Mitchell Edwards, Pflugerville; David Joseph Kuettel, Austin, all of Tex.

[73] Assignee: International Business Machines Corporation, Armonk, N.Y.

[21] Appl. No.: 08/976,381

[22] Filed: Nov. 21, 1997

[51] Int. Cl.⁷ .................................................. G06F 17/30
[52] U.S. Cl. ............................ 707/10; 707/101; 707/200
[58] Field of Search .............................. 707/10, 101, 200

[56] References Cited

U.S. PATENT DOCUMENTS

| | | | |
|---|---|---|---|
| 5,689,701 | 11/1997 | Ault et al. | 707/10 |
| 5,745,752 | 4/1998 | Hurvig et al. | 707/200 |
| 5,745,888 | 4/1998 | Bauer et al. | 707/1 |

*Primary Examiner*—Wayne Amsbury
*Attorney, Agent, or Firm*—Volel Emile

[57] ABSTRACT

An apparatus and method of mapping a file name to a computer system in a network of computer systems are provided. In a first embodiment, a list of names of the computer systems starting with a root name is created. The filename itself starts with a root name and consists of an aggregation of names. When the filename is obtained, each name is matched one at a time and in the order of appearance to the names in the list. In order for a match, the order of appearance of the names in the list of names and that of the names in the filename must be the same. The last name in the list of names to be matched with a name in the filename represents a computer system within which the file is contained. In a second embodiment, the list of names is in the form of a tree of names. Matching the names of the tree to the names in the filename includes traversing a branch of that tree to a leaf node, the leaf node being the last node in the tree.

24 Claims, 4 Drawing Sheets

METHOD OF LOCATING AND DOWNLOADING FILES ON A NETWORK

BACKGROUND OF THE INVENTION

1. Field of the Invention

The present invention relates generally to file transfer and, more particularly, to a method of locating and downloading a file on a network.

2. Description of the Related Art

Most Java applications, or applets, reside on a network in centralized servers. When a client system wants to use an applet, it first has to contact the server within which the applet is located and request that the applet be delivered. Once received, the applet can be run by the client system. For example, suppose a user at a client system wants to check his/her financial portfolio, the user needs to first contact his financial institution's server system using a web browser to request the portfolio data. The data will then be downloaded to the user accompanied with an applet. The applet is used to view the portfolio data. When the user has finished viewing the data and stopped running the browser, the downloaded applet along with the financial data will be deleted from the client's system memory.

Aside from applets, Java includes a portable, platform independent software component model called "JavaBean". A "JavaBean" or bean is the most extensively used API (application program interface) in Java programming. It provides application developers with a framework for reusable, embeddable, modular software components. For example, a first bean may have been designed and used by IBM to develop a particular software product and a second bean may have been designed and used by Sun Microsystems to develop an entirely different software product. Using some logic, a third developer may link or wire these two beans together to produce a composite bean. This composite bean may function totally different from either parent bean.

The code implementing the first and the second bean may reside on a server at IBM and Sun, respectively. Before running the composite bean on a local computer system, then, the third developer has to merely download the two pieces of code to that system.

Allowing software code to reside at a location where they can be easily accessed may be beneficial to both software vendors and customers. For example, suppose a vendor has a collection of programs long enough to fill several diskettes or compact disks (CDs). Every time a customer buys a license to that software, the vendor has to provide these diskettes or CDs to that customer. In addition, each time the software is upgraded, that version has to be distributed to the licensed customers. If, however, the programs reside at centralized locations, the vendor need only provide the customers with, for instance, a menu of what is available and a quick way of accessing the programs. In this case, then, the vendor will save money by not manufacturing and distributing CDs. Some of this saving may be passed on to the customers in the form of reduced fees. In addition, the customer is guaranteed to always use the latest version of the software, especially, when these software components are being maintained by different entities, as in the example above.

Consequently, there is a need in the art to allow programs to reside in a centralized location to which customers have access. However, there must be a method to quickly locate and download these programs.

SUMMARY OF THE INVENTION

The need in the art is addressed by the present invention. The present invention provides an apparatus and method of mapping a file name to a computer system in a network of computer systems are provided. In a first embodiment, a list of names of the computer systems starting with a root name is created. The filename itself starts with a root name and consists of an aggregation of names. When the filename is obtained, each name is matched one at a time and in the order of appearance to the names in the list. In order for a match, the order of appearance of the names in the list of names and that of the names in the filename must be the same. The last name in the list of names to be matched with a name in the filename represents a computer system within which the file is contained.

In a second embodiment, the list of names is in the form of a tree of names. Matching the names of the tree to the names in the filename includes traversing a branch of that tree to a leaf node, the leaf node being the last node in the tree.

DESCRIPTION OF THE INVENTION

Figure 1:
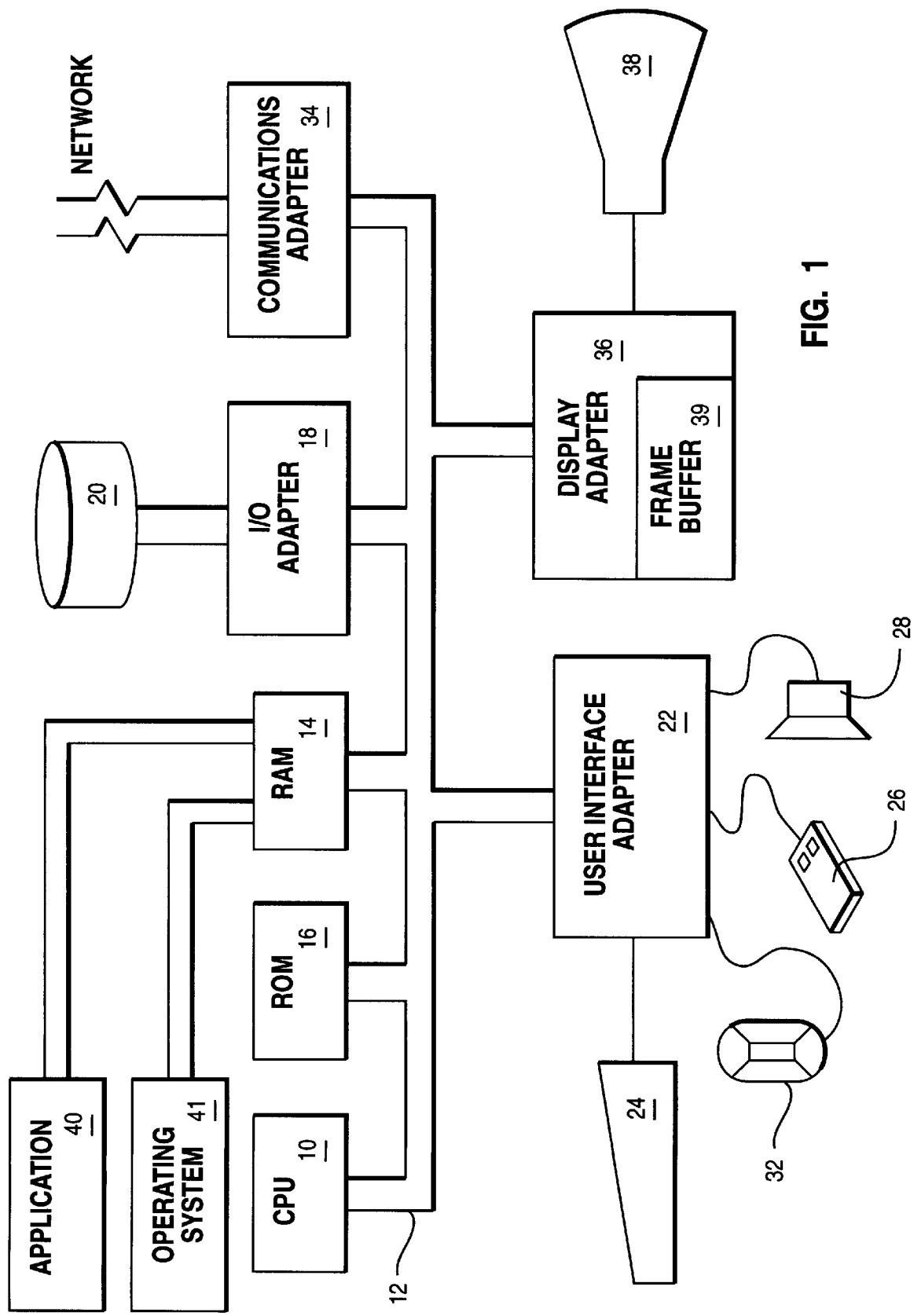
FIG. 1 depicts a workstation or client system as used in the present invention.

Referring to FIG. 1, there is depicted a workstation or client system, having a central processing unit (CPU) 10, such as a conventional microprocessor, and a number of other units interconnected via a bus 12. The client system has a random access memory (RAM) 14, a read only memory (ROM) 16, an input/output (I/O) adapter 18 for connecting peripheral devices such as floppy disk unit 20 to the bus, a user interface adapter 22 for connecting a keyboard 24, a mouse 26, a speaker 28, a microphone 32, and/or other user interface devices such as a touch screen device (not shown) to the bus. The client system also has a communication adapter 34 for connecting the client system to a communication network. Finally, the client system has a display adapter 36, including a frame buffer 39, for connecting the bus to a display device 38.

Figure 2:
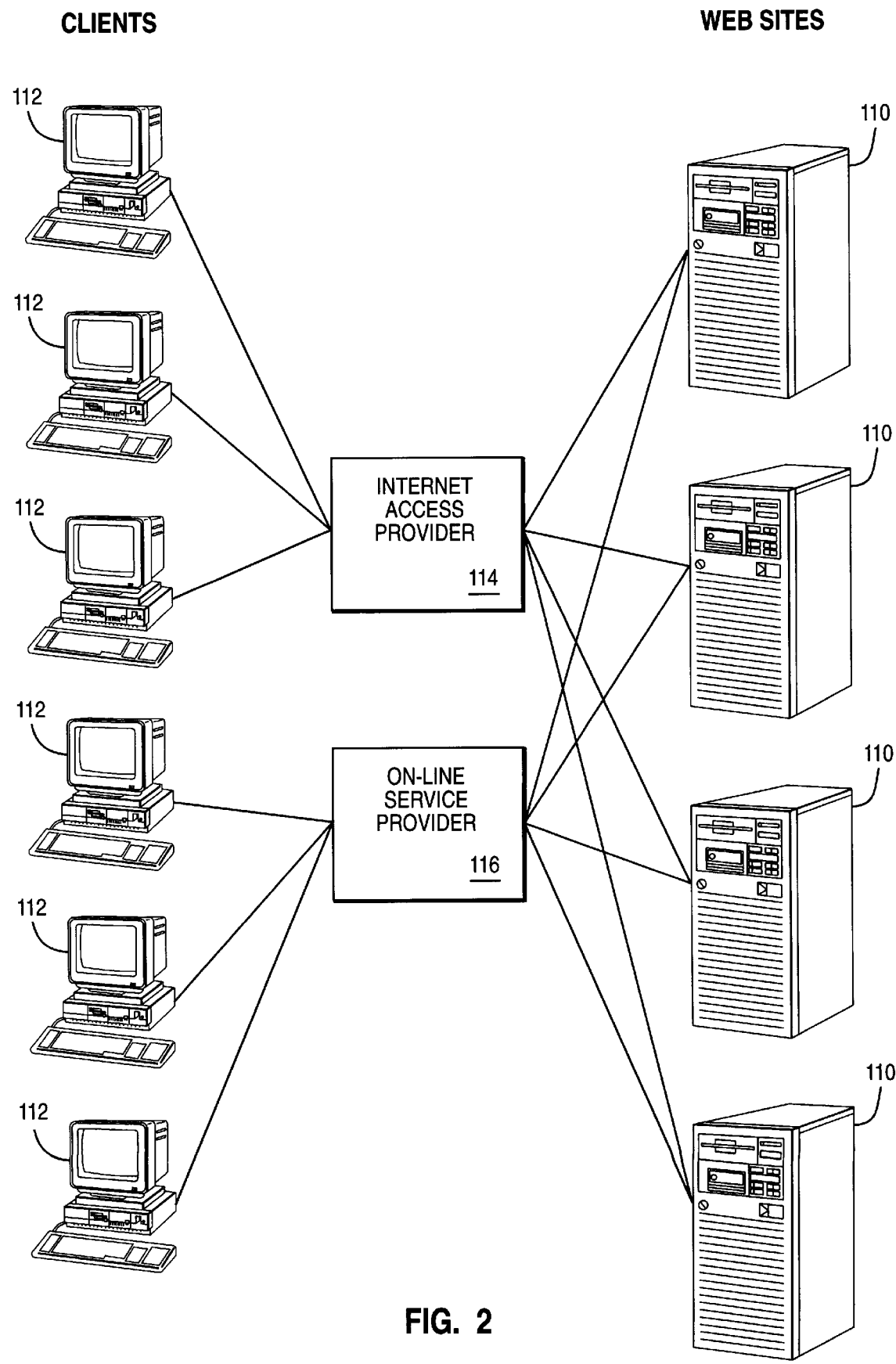
FIG. 2 illustrates a communication network based on a client-server model typically utilized in the Internet.

FIG. 2 illustrates a communication network based on a client-server model typically utilized in the Internet. Conceptually, the Internet comprises a large network of sites 110 that are accessible by client systems 112. Each client 112 is a user. Clients 112 access the Internet through either a private Internet access provider 114 (i.e., Internet America™) or an on-line service provider 116 (i.e., America On-line™, Prodigy etc.) Access provider 112 and service provider 116 will hereinafter be collectively referred to as web servers. Each of the clients 112 may run a web browser which is a known software tool used to access sites 110 via the web servers 114 and 116. The client systems 112 access the Internet through the communication adapter 34.

Figure 3:
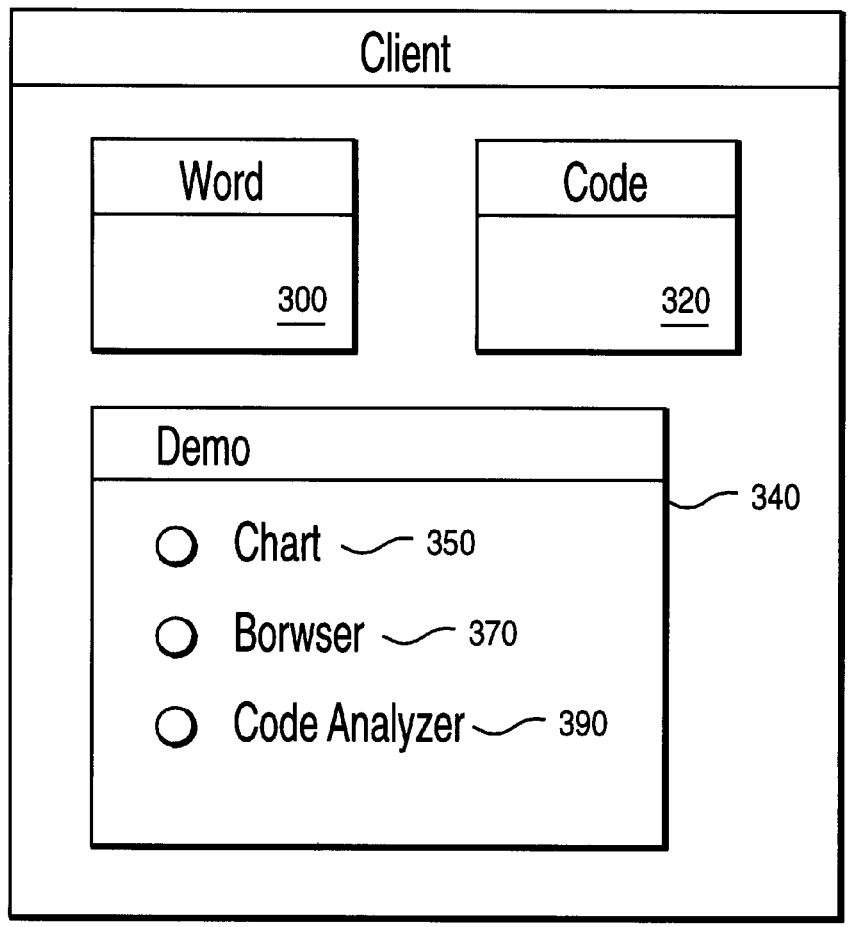
FIG. 3 depicts a menu showing all the programs to which a user has access.
Figure 4:
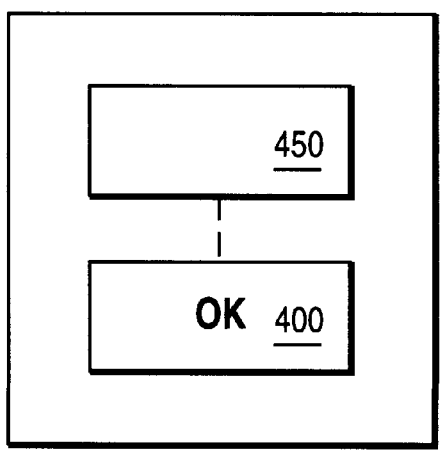
FIG. 4 depicts an example of a bean.

According to the invention, when a user buys a software license from a company, the company needs only provide the user with a CD. On the CD may be a menu showing all the programs to which the user has access. For example, in FIG. 3 are depicted a word processing application program 300, code data 320 and a demonstration window 340 that has a chart button 350, a browser button 370 and a code analyzer button 390. (A button is a simple representation of a bean.) Thus, the user will have access to everything that is showing. Note that this may not always be the case. That is, a user may have limited access or no access at all to one or all of what is shown in FIG. 3.

The user in this case is at one of the client system 112. This client system 112 is running Java. Suppose the user wants to run the code analyzer program, the user needs only point and click on the code analyzer button 390 with the aid of the mouse 36. Once this occurs, the client 112 will contact the server 110 in which the program is located, the program then will be downloaded to the client 112 where it will run. This whole process may be totally transparent to the user.

When the user clicks on the code analyzer button 390, a class loader is notified of the mouse click event. The class loader is given a fully qualified class name of the code analyzer and returns the byte code that implements the code analyzer program. A fully qualified class name is made up of a package name and the file class name. A package name is explained below. The returned byte code is used by the Java Virtual Machine to run the analyzer program on the requesting client system 112.

Within the client system 112 is a table mapping all the servers to which the client 112 is subscribed. For example, if the client 112 may need a file from an IBM server entitled com.ibm.tools, the name of that server will be located in that table. This table may be filled in one server at a time. That is, each time the client 112 accesses a server to retrieve a file, the name of the server may be added in that table if it was not already there. Adding data in tables is well known in the art and is thus not explained. Alternatively, a table of all the servers from which files can be retrieved may be added onto the diskette or CD.

Figure 5:
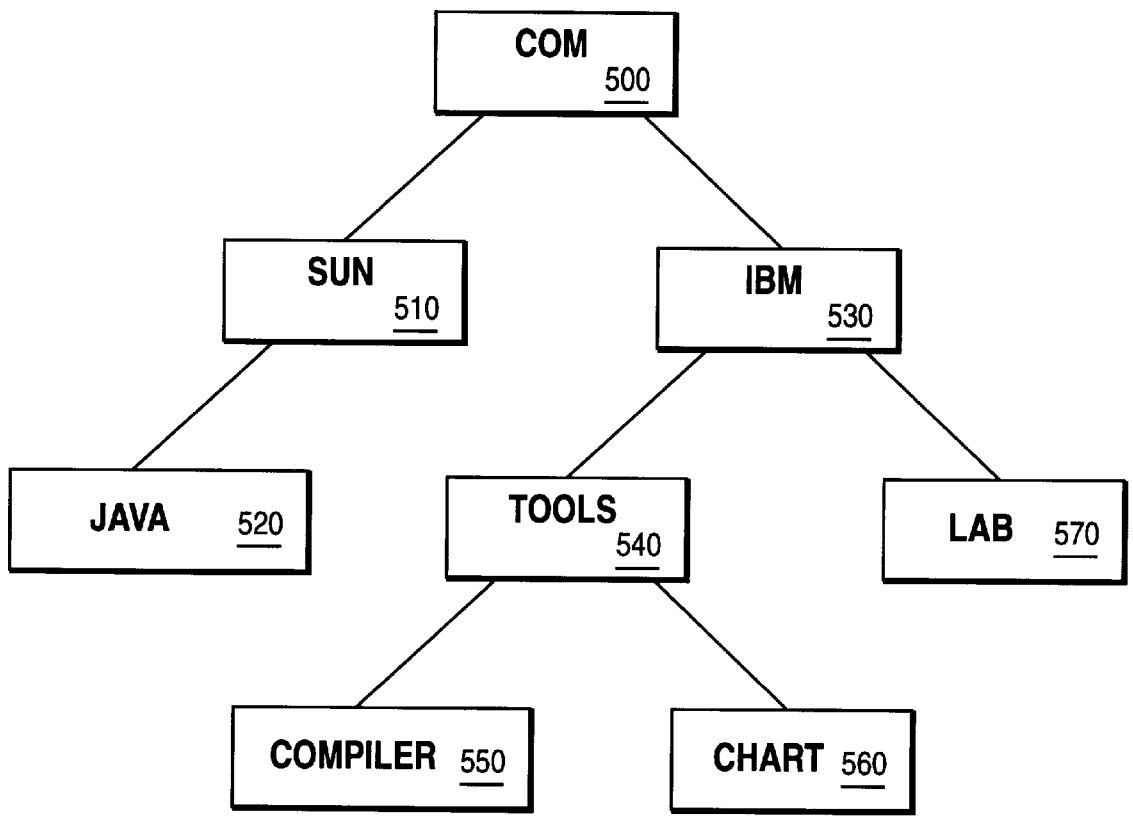
FIG. 5 depicts a class mapping in a server table.

FIG. 5 depicts a class mapping of that table. In the Java programming language, there is a hierarchical naming convention that is designed to avoid class name conflicts among different companies. That is, a class file from a company is labeled with a prefix indicating that company. For example, a class file developed by IBM will have a "com.ibm" prefix and a class file developed by Sun Microsystems will have a "com.sun" prefix. The boxes attached to the Sun box 510 and IBM box 530 are nodes indicating where files may be located. Using the hierarchical convention, a class is defined as part of a package. For example, if the code analyzer is an IBM product and resides in the laboratory server Lab 570, its package name would be "com.ibm.lab.codeAnalyzer". If instead it is a Sun product that resides in the Java server 520, its package name would be: "com.sun.java.codeAnalyzer".

Suppose the class loader is requested to fetch the class file: "com.ibm.lab.codeAnalyzer.mgmtsSvcs", the class loader will traverse the tree branch "com-ibm-lab" by matching the first three parts of the class file's name with the class mapping of FIG. 5. However, the last two parts (i.e., codeAnalyzer.mgmtSvcs) will not have a match. This, then, indicates to the class loader that mgmtSvcs is a file that is in the class directory "codeAnalyzer" in the lab server 570. Thus, the server that needs to be contacted is Lab server 570.

Figure 6:
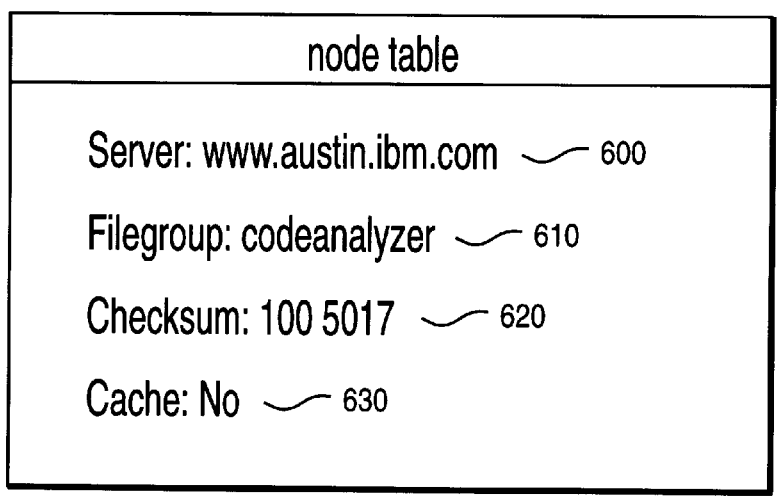
FIG. 6 depicts a node table used in the present invention.

FIG. 6 depicts a node table that is contained within each node representing a server in the class mapping table of FIG. 5. The node table contains a server name 600, a filegroup name 610, a checksum number 620 and an indication as to whether the filegroup has been cached 630. The name of the server is used to contact the Lab server 570. In this particular example, the name or address of the Lab server 570 is: www.austin.ibm.com and the name of the filegroup is codeanalyzer.

The code analyzer program may have a plurality of different components. For example, it may contain a software component that draws charts or another one that manages available services and so on. Ordinarily, when one software component is used, the likelihood that another component of that group will be used is very great. Thus, to optimize the system, if a component of the codeanalyzer needs to be downloaded, all the components that make up the code analyzer are also downloaded. In other words, the filegroup will be downloaded.

A check sum is also downloaded. The check sum is used to quickly determine whether a group of files that was once downloaded and stored continues to be the latest version of those files. If so, the group of files will not be downloaded since it is stored locally. If not, the latest version will be downloaded and stored to replace the earlier version. Thus, before requesting that the server download a file that has been cached or stored, the client system will first ask for the checksum residing at the server to compare with its own. The cache 630 indicates whether a filegroup is stored locally or not.

Some times a Class file may access a resource file. A class file accesses a resource file by invoking the method class.getResourceAsStream(). This, then allows the class loader to fetch the correct file. For example, if the codeAnalyzer program needs to read in the image file "image.gif", it should call the method using the following: com.ibm.lab.codeAnalyzer.getResourceAsStream (image.gif). Just like before, the class name will be used to contact the correct server to get the requested file.

Note that if the code analyzer program resided in the tools server 540, its package name would be: "com.ibm.tools.codeAnalyzer". If instead it resided in the chart server 560, its package name would then be: "com.ibm.tools.chart.codeAnalyzer". Consequently, this hierarchical name convention can also be used to avoid class name conflicts among different divisions of a company.

Obviously, any network protocol can be used to contact the servers. In this case however, sockets can be used. Sockets is a primitive protocol for passing data between machines. In addition the Java protocol "Remote Method Invocation" (RMI) may also be used. The lab server 570 must also be running Java, and particularly, a Java server program that will allow it to provide the byte code of the requested program. Thus, the Java server program should contain at the minimum a getclass() method which would take the name of the class file as argument and return an array of bytes representing the program.

Hence, in operation, a user runs a Java program that is located on a CD or any other storage mechanism. The program displays a menu of all the programs to which the user is licensed in the form of buttons. If the user wants to run one of the licensed programs, the user merely clicks on the button representing the program. Once this is done, a class loader is activated. The class loader is given as argument the fully qualified name of the requested file (i.e., com.ibm.lab.codeAnalyzer). Using the package name and a table containing a class mapping of all the servers to which the client is subscribed, the class loader is able to obtain the correct address of the server containing the requested file. The server is then asked to forward the byte code of the program. Once the byte code is downloaded, it is run on the client machine.

If the client system 112 stores the downloaded byte code locally, another entry may be added to the node table of FIG. 6. This entry will indicate in what directory the downloaded program is stored. Alternatively, the directory where the program is stored may be put into a class path or list of directories that needs to be checked.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method, for use in an information handling system, of mapping a file name to a computer system containing said file, said computer system containing said file being in a network of computer systems, said file name being a composite name, said method comprising the steps of:

creating a list of names of said computer systems, said list of names being arranged in an order wherein the first name in the list is the name of a root computer system, each succeeding name being the name of a computer system located logically the closest to the root computer system;

obtaining said file name; and matching each name in said composite file name to each name in said list, the names in said composite file name being in the same order of appearance as that in the list of names, a last name to be matched being said computer system containing said file.

2. The method of claim 3 further comprising the steps of obtaining an address of said computer system containing said file from a table containing a set of data items.

3. The method of claim 1 wherein said list of names is in the form of a tree of names wherein two or more computer systems located logically at the same proximity to said root computer system create, respectively, two or more branches of said tree.

4. The method of claim 3 wherein said root name represents which company presently owns said file.

5. The method of claim 4 wherein each name of said file name is separated by a period.

6. The method of claim 5 wherein said corresponding table further includes a filegroup name, said filegroup name indicating all files of a program.

7. The method of claim 6 wherein said corresponding table further includes a checksum number, said checksum number being used to quickly identify whether said filegroup is obsolete.

8. The method of claim 7 wherein said corresponding table further includes an indication as to whether said file has been stored locally.

9. An apparatus, for use in an information handling system, for mapping a file name to a computer system containing said file, said computer system being in a network of computer systems, said file name being a composite name, said apparatus comprising:

means for creating a list of names of said computer systems, said list of names being arranged in an order wherein the first name in the list is the name of a root computer system, each succeeding name being the name of a computer system located logically the closest to the root computer system;

means for obtaining said file name; and means for matching each name in said composite file name to each name in said list, the names in said composite file name being in the same order of appearance as that in the list of names, a last name to be matched being said computer system containing said file.

10. The apparatus of claim 1 further comprising means for obtaining an address of said computer system containing said file from a table containing a set of data items.

11. The apparatus of claim 9 wherein said list of names is in the form of a tree of names wherein two or more computer systems located logically at the same proximity to said root computer system create, respectively, two or more branches of said tree.

12. The apparatus of claim 11 wherein said root name represents which company presently owns said file.

13. The apparatus of claim 12 wherein each name of said file name is separated by a period.

14. The apparatus of claim 13 wherein said corresponding table further includes a filegroup name, said filegroup name indicating all files of a program.

15. The apparatus of claim 14 wherein said corresponding table further includes a checksum number, said checksum number being used to quickly identify whether said filegroup is obsolete.

16. The apparatus of claim 15 wherein said corresponding table further includes an indication as to whether said file has been stored locally.

17. A computer program product for mapping a file name to a computer system containing said file, said computer program product having computer usable program code means embodied in a medium, said file name being a composite name, said computer system being in a network of computer systems, said method comprising:

computer usable program code means for creating a list of names of said computer systems, said list of names being arranged in an order wherein the first name in the list is the name of a root computer system, each succeeding name being the name of a computer system located logically the closest to the root computer system;

computer usable program code means for obtaining said file name; and computer usable program code means for matching each name in said composite file name to each name in said list, the names in said composite file name being in the same order of appearance as that in the list of names, a last name to be matched being said computer system containing said file.

18. The computer program product of claim 17 wherein said list of names is in the form of a tree of names wherein two or more computer systems located logically at the same proximity to said root computer system create, respectively, two or more branches of said tree.

19. The computer program product of claim 17 further comprising computer usable program code means for obtaining an address of said computer system containing said file from a table containing a set of data items.

20. The computer program product of claim 19 wherein said root name represents which company presently owns said file.

21. The computer program product of claim 20 wherein each name of said file name is separated by a period.

22. The computer program product of claim 21 wherein said corresponding table further includes a filegroup name, said filegroup name indicating all files of a program.

23. The computer program product of claim 22 wherein said corresponding table further includes a checksum number, said checksum number being used to quickly identify whether said filegroup is obsolete.

24. The computer program product of claim 23 wherein said corresponding table further includes an indication as to whether said file has been stored locally.

* * * * *